(12) United States Patent
Thurab

(10) Patent No.: US 6,186,573 B1
(45) Date of Patent: Feb. 13, 2001

(54) SWIVELING VEHICLE SEAT

(76) Inventor: Judy Thurab, 1600 Windorah Way #B, West Palm Beach, FL (US) 33411

( * ) Notice: Under 35 U.S.C. 154(b), the term of this patent shall be extended for 0 days.

(21) Appl. No.: 09/439,327

(22) Filed: Nov. 12, 1999

(51) Int. Cl.[7] .................................................. B60N 1/04
(52) U.S. Cl. .................................. 296/65.14; 296/65.13; 297/344.22; 297/344.26
(58) Field of Search .................. 296/65.13, 65.07, 296/65.12, 65.16, 65.01, 63, 64, 65.06, 65.15; 297/344.21, 344.22, 344.23, 344.26

(56) References Cited

U.S. PATENT DOCUMENTS

| | | | |
|---|---|---|---|
| 2,744,565 | * | 5/1956 | Zwick .............................. 296/65.01 X |
| 3,659,895 | * | 5/1972 | Dresden ......................... 296/65.13 X |
| 4,669,780 | * | 6/1987 | Sakakibara et al. ........... 296/65.16 X |
| 4,815,785 | * | 3/1989 | Goodall et al. ................... 296/65.13 |
| 5,000,504 | * | 3/1991 | Munguia ........................ 296/65.13 X |
| 5,042,864 | * | 8/1991 | Mochizuki ..................... 296/65.13 X |
| 5,161,765 | * | 11/1992 | Wilson ........................... 296/65.13 X |

* cited by examiner

*Primary Examiner*—Joseph D. Pape

(57) ABSTRACT

A swiveling vehicle seat for permitting swiveling a front vehicle seat into a rearward facing position in spaced relationship to a vehicle air bag to permit safe placement of a child seat in the swiveled front seat of the vehicle. The swiveling vehicle seat includes a vehicle seat adapted for placement in the front passenger area of a vehicle. The seat has a back support portion pivotally coupled to a bottom portion. The bottom portion is coupled to a swiveling base fixed to the vehicle. The swiveling base is designed to permit adjustment of the vehicle seat between forward and rearward facing positions to permit safe placement of a child safety harness device in the seat when the seat is facing rearward.

15 Claims, 3 Drawing Sheets

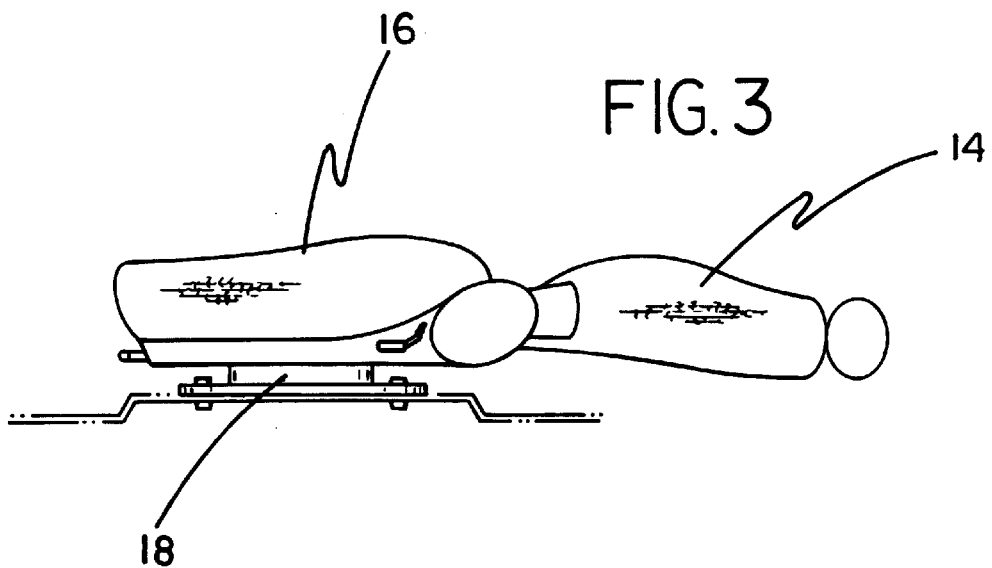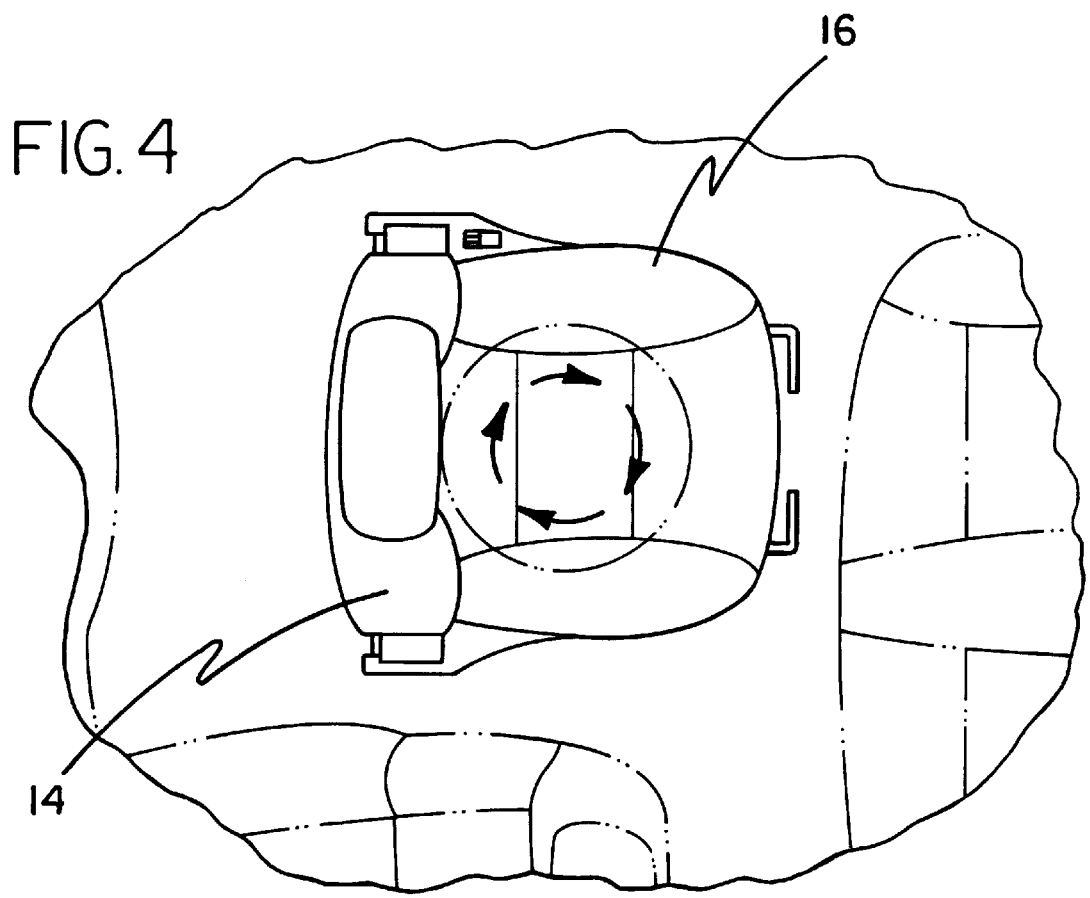

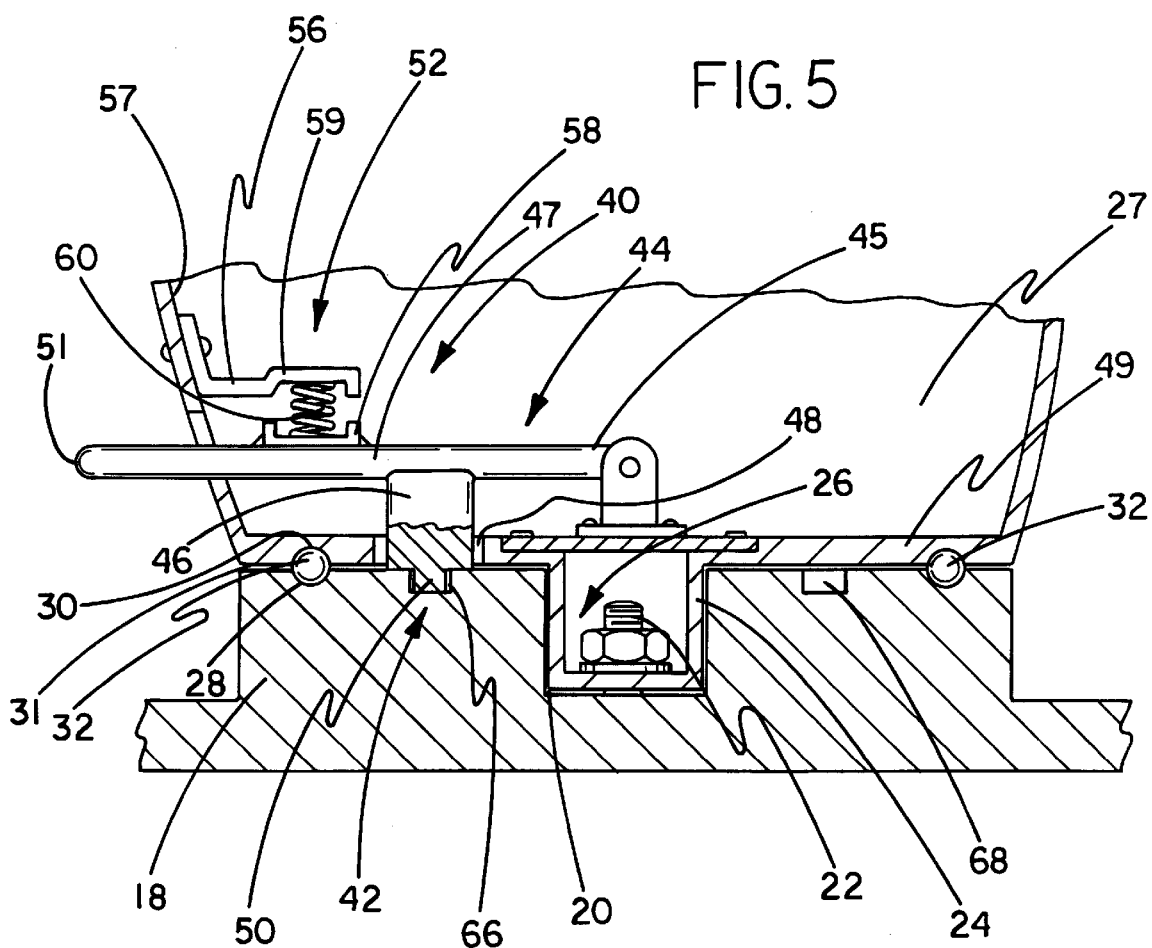

SWIVELING VEHICLE SEAT

BACKGROUND OF THE INVENTION

1. Field of the Invention

The present invention relates to vehicle seats and more particularly pertains to a new swiveling vehicle seat for permitting swiveling a front vehicle seat into a rearward facing position in spaced relationship to a vehicle air bag to permit safe placement of a child seat in the swiveled front seat of the vehicle.

2. Description of the Prior Art

The use of vehicle seats is known in the prior art. More specifically, vehicle seats heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,846,529; U.S. Pat. No. 4,555,135; U.S. Pat. No. 4,802,706; U.S. Pat. No. 3,081,973; U.S. Pat. No. 1,063,809; and U.S. Pat. No. Des. 301,188.

While these devices fulfill their respective, particular objectives and requirements, the aforementioned patents do not disclose a new swiveling vehicle seat. The inventive device includes a vehicle seat adapted for placement in the front passenger area of a vehicle. The seat has a back support portion pivotally coupled to a bottom portion. The bottom portion is coupled to a swiveling base fixed to the vehicle. The swiveling base is designed to permit adjustment of the vehicle seat between forward and rearward facing positions to permit safe placement of a child safety harness device in the seat when the seat is facing rearward.

In these respects, the swiveling vehicle seat according to the present invention substantially departs from the conventional concepts and designs of the prior art, and in so doing provides an apparatus primarily developed for the purpose of for permitting swiveling a front vehicle seat into a rearward facing position in spaced relationship to a vehicle air bag to permit safe placement of a child seat in the swiveled front seat of the vehicle.

SUMMARY OF THE INVENTION

In view of the foregoing disadvantages inherent in the known types of vehicle seats now present in the prior art, the present invention provides a new swiveling vehicle seat construction wherein the same can be utilized for permitting swiveling a front vehicle seat into a rearward facing position in spaced relationship to a vehicle air bag to permit safe placement of a child seat in the swiveled front seat of the vehicle.

The general purpose of the present invention, which will be described subsequently in greater detail, is to provide a new swiveling vehicle seat apparatus and method which has many of the advantages of the vehicle seats mentioned heretofore and many novel features that result in a new swiveling vehicle seat which is not anticipated, rendered obvious, suggested, or even implied by any of the prior art vehicle seats, either alone or in any combination thereof.

To attain this, the present invention generally comprises a vehicle seat adapted for placement in the front passenger area of a vehicle. The seat has a back support portion pivotally coupled to a bottom portion. The bottom portion is coupled to a swiveling base fixed to the vehicle. The swiveling base is designed to permit adjustment of the vehicle seat between forward and rearward facing positions to permit safe placement of a child safety harness device in the seat when the seat is facing rearward.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new swiveling vehicle seat apparatus and method which has many of the advantages of the vehicle seats mentioned heretofore and many novel features that result in a new swiveling vehicle seat which is not anticipated, rendered obvious, suggested, or even implied by any of the prior art vehicle seats, either alone or in any combination thereof.

It is another object of the present invention to provide a new swiveling vehicle seat that may be easily and efficiently manufactured and marketed.

It is a further object of the present invention to provide a new swiveling vehicle seat that is of a durable and reliable construction.

An even further object of the present invention is to provide a new swiveling vehicle seat which is susceptible of a low cost of manufacture with regard to both materials and labor, and which accordingly is then susceptible of low prices of sale to the consuming public, thereby making such swiveling vehicle seat economically available to the buying public.

Still yet another object of the present invention is to provide a new swiveling vehicle seat which provides in the apparatuses and methods of the prior art some of the advantages thereof, while simultaneously overcoming some of the disadvantages normally associated therewith.

Still another object of the present invention is to provide a new swiveling vehicle seat for permitting swiveling a front vehicle seat into a rearward facing position in spaced relationship to a vehicle air bag to permit safe placement of a child seat in the swiveled front seat of the vehicle.

Yet another object of the present invention is to provide a new swiveling vehicle seat which includes a vehicle seat adapted for placement in the front passenger area of a vehicle. The seat has a back support portion pivotally coupled to a bottom portion. The bottom portion is coupled to a swiveling base fixed to the vehicle. The swiveling base is designed to permit adjustment of the vehicle seat between forward and rearward facing positions to permit safe placement of a child safety harness device in the seat when the seat is facing rearward.

Still yet another object of the present invention is to provide a new swiveling vehicle seat that is sized to permit swiveling of the seat within a front passenger area of a vehicle.

Even still another object of the present invention is to provide a new swiveling vehicle seat that has a back support portion that is positioned in spaced relationship to a vehicle air bag when the seat is in a rearward facing position.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a side view of the present invention.

FIG. 4 is a top view of the present invention.

FIG. 5 is a cross-sectional view of the present invention taken along line 5—5 of FIG. 4.

DESCRIPTION OF THE PREFERRED EMBODIMENT

Figure 1:
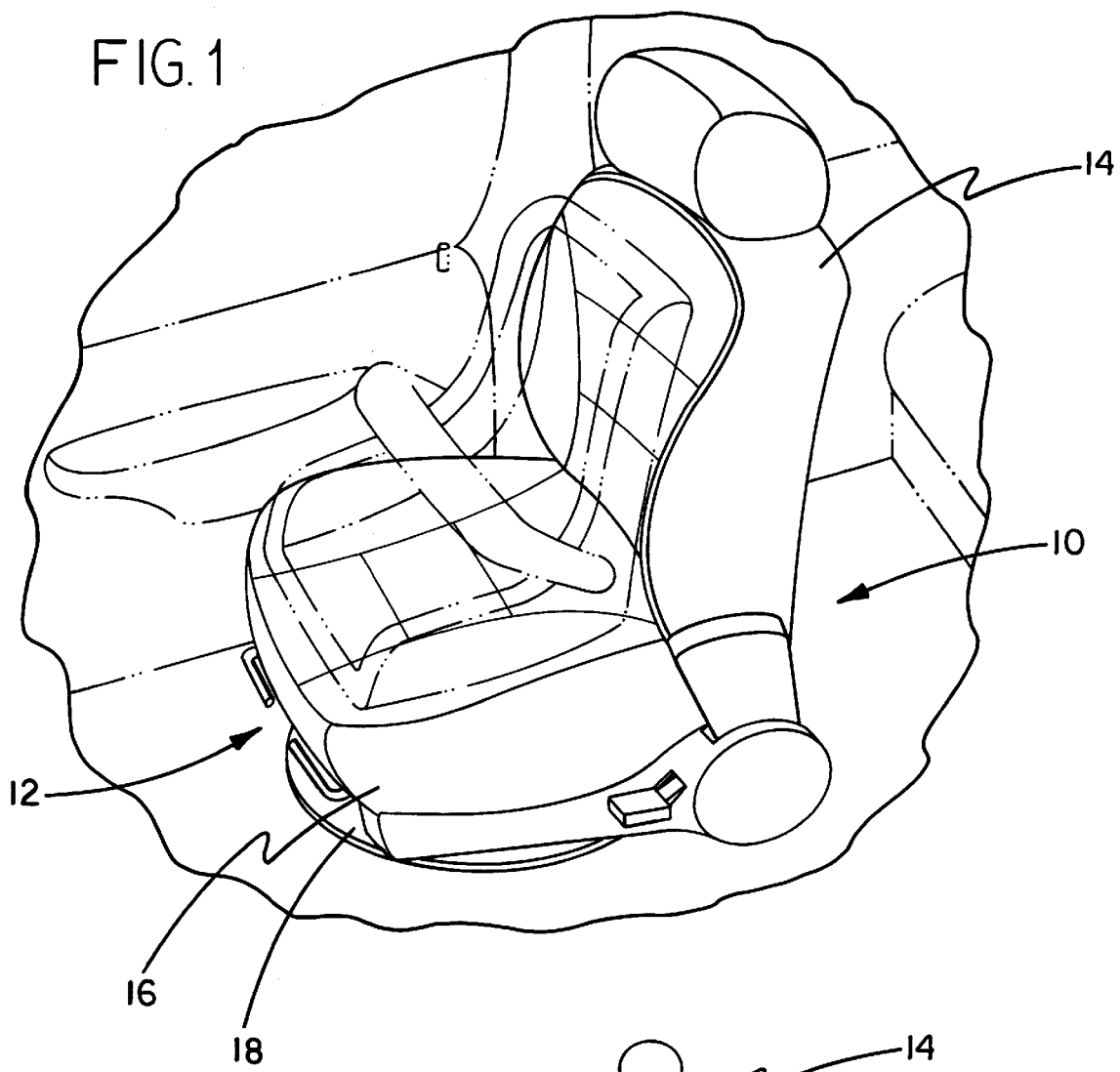
FIG. 1 is a perspective view of a new swiveling vehicle seat according to the present invention.
Figure 2:
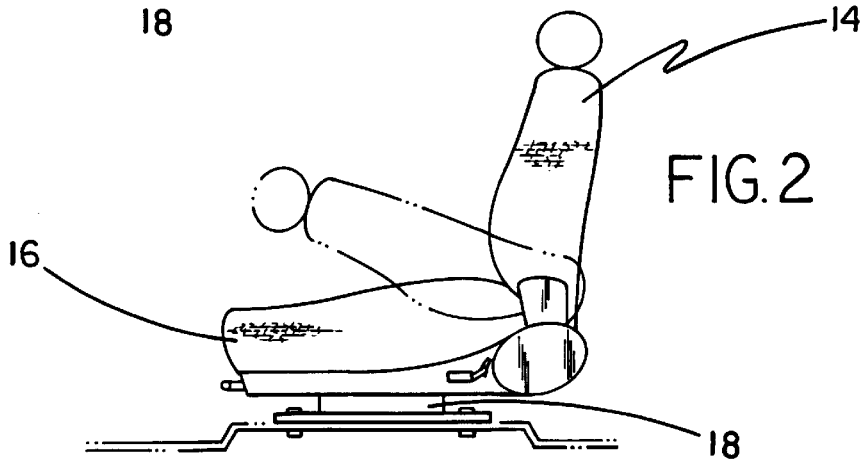
FIG. 2 is a side view of the present invention.

With reference now to the drawings, and in particular to FIGS. 1 through 5 thereof, a new swiveling vehicle seat embodying the principles and concepts of the present invention and generally designated by the reference numeral 10 will be described.

As best illustrated in FIGS. 1 through 5, the swiveling vehicle seat assembly 10 is designed for use in the front of a passenger area of a vehicle. The vehicle seat assembly generally comprises a vehicle seat 12 having a back support portion 14 and a bottom portion 16. A base 18 is coupled to the bottom portion and is designed for coupling the seat to the floor of the passenger area of a vehicle. The vehicle seat is rotatable between a forward facing and a rearward facing orientation relative to the vehicle for permitting an infant in a car seat to face away from the direction of travel and the air bag of the vehicle.

The base includes a generally cylindrical hole 20 and a threaded connection member 22 extending upwardly in the hole. The bottom portion includes a generally cylindrical connecting portion 24 positionable in the cylindrical hole of the base. The connection portion is coupled to the connection member of the base using a bolt assembly 26 such that the vehicle seat is rotatable around the connection member of the base.

The base further includes an annular bottom groove 28 on an upper surface 29 of the base. The bottom portion includes an annular upper groove 30 on a lower surface 31 of the bottom portion. The upper groove is alignable with the lower groove when the bottom portion is engaged to the base. A plurality of bearings 32 are positioned between the lower groove and the upper groove for facilitating rotation of the bottom portion relative to the base.

The bottom portion includes a swivel adjustment assembly 40 and the base includes a plurality of retaining indents 42 for engaging the swivel adjustment assembly whereby the bottom portion is prevented from rotating relative to the base. The swivel adjustment assembly includes an adjustment arm 44 having a proximal end 45 pivotally coupled to the bottom portion. The adjustment arm is positioned substantially within an interior space 27 of the bottom portion. The adjustment arm further has an extension portion 46 depending downwardly from a medial portion 47 of the adjustment arm through an aperture 48 in a bottom 49 of the bottom portion. The adjustment arm also includes a retaining portion 50 depending downwardly from the extension portion. The retaining portion is insertable into a selectable one of the retaining indents for preventing rotation of the bottom portion relative to the base.

A biasing assembly 52 is positioned in the interior space of the bottom portion for biasing the swivel arm downwardly into engagement with a selectable one of the retaining indents. A distal end 51 of the swivel arm protrudes outwardly from a side 53 of the bottom portion such that the distal end is designed for manipulation by a user to disengage the adjustment arm from the retaining indent for permitting rotation of the bottom portion relative to the base.

The biasing assembly includes a generally S-shaped retention bracket 56 coupled to an interior wall 57 of the bottom portion. The biasing assembly also includes a biasing member retention plate 58 coupled to an upper surface of the adjustment arm. The biasing member retention plate is aligned with a biasing member retention portion 59 of the retention bracket. A biasing member 60 is positioned between the biasing member retention plate and the biasing member retention portion of the retention bracket.

In an embodiment, the plurality of retaining indents comprise a pair of diametrically opposed retaining indents 66 and 68 positioned such that the vehicle seat is positioned in a forward facing orientation when the swivel adjustment assembly is engaged to the first retaining indent 66 and the vehicle seat is positioned in a rearward facing orientation when the swivel adjustment assembly is engaged to the second retaining indent 68.

The back support portion of the vehicle seat is pivotally coupled to the bottom portion such that the back support portion is selectively positionable substantially coplanar with respect to the bottom portion. The back support portion further is selectively positionable to fold over the bottom portion for permitting ease in turning of the seat.

The back support portion is designed for being positioned in spaced relationship to an air bag of the vehicle for preventing injury to an infant positioned in the vehicle seat while the vehicle seat is positioned in the rearward facing orientation.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle seat assembly for a front passenger area of a vehicle, the vehicle seat assembly comprising:

a vehicle seat having a back support portion and a bottom portion;

a base coupled to the bottom portion, the base being adapted for coupling the seat to a vehicle;

the vehicle seat being swivelable between a forward facing and a rearward facing orientation relative to the vehicle;

wherein said back support portion is adapted for being positioned in spaced relationship to an air bag of the vehicle for preventing injury to an infant positioned in said vehicle seat while said vehicle seat is positioned in said rearward facing orientation;

said base having an annular bottom groove on an upper surface of said base, said annular bottom groove extending around proximate a perimeter edge of said base, said outer perimeter edge of said base being adjacent to a base of a perimeter wall of said bottom portion of said vehicle seat;

said bottom portion having an annular upper groove on a lower surface of said bottom portion, said upper groove extending around proximate said perimeter wall of said bottom portion of said vehicle seat such that said annular upper groove is alienable with said lower groove when said bottom portion is engaged to said base;

a plurality of bearings being positioned between said lower groove and said upper groove for facilitating rotation of said bottom portion relative to said base;

said swivel adjustment assembly having an adjustment arm having a proximal end pivotally coupled to a center of said bottom portion, said adjustment arm being positioned substantially within an interior space of said bottom portion, said adjustment arm further having an extension portion depending downwardly from a medial portion of said adjustment arm through an aperture in a bottom of said bottom portion, said aperture being positioned between said center of said bottom portion and said upper groove, said adjustment arm having a retaining portion depending downwardly from said extension portion, said retaining portion being insertable into said retaining indents for preventing rotation of said bottom portion relative to said base.

2. The vehicle seat assembly of claim 1, further comprising:

said base having a generally cylindrical hole and a threaded connection member extending upwardly in said hole;

said bottom portion having a generally cylindrical connecting portion positionable in said cylindrical hole of said base, said connection portion being coupled to said connection member of said base such that said vehicle seat is rotatable around said connection member of said base.

3. The vehicle seat assembly of claim 1, further comprising:

said bottom portion including a swivel adjustment assembly and said base including a plurality of retaining indents for engaging said swivel adjustment assembly whereby said bottom portion is prevented from rotating relative to said base.

4. The vehicle seat assembly of claim 3, further comprising:

a biasing assembly positioned in said interior space of said bottom portion, said biasing assembly being for biasing said swivel arm downwardly into engagement with a selectable one of said retaining indents.

5. The vehicle seat assembly of claim 4, further comprising:

a distal end of said swivel arm protruding outwardly from a side of said bottom portion such that said distal end is adapted for manipulation by a user to disengage said adjustment arm from said retaining indent for permitting rotation of said bottom portion relative to said base.

6. The vehicle seat assembly of claim 3, further comprising:

said plurality of retaining indents comprising a pair of diametrically opposed retaining indents positioned such that said vehicle seat is positioned in a forward facing orientation when said swivel adjustment assembly is engaged to a first one of said pair of retaining indents; and wherein said vehicle seat is positioned in a rearward facing orientation when said swivel adjustment assembly is engaged to a second one of said pair of retaining indents.

7. The vehicle seat assembly of claim 1, further comprising:

said back support portion of said vehicle seat being pivotally coupled to said bottom portion such that said back support portion is selectively positionable substantially coplanar with respect to said bottom portion; and said back support portion further being selectively positionable to fold over said bottom portion of said bottom portion.

8. A vehicle seat assembly for a front passenger area of a vehicle, the vehicle seat assembly comprising:

a vehicle seat having a back support portion and a bottom portion:

a base coupled to the bottom portion, the base being adapted for coupling the seat to a vehicle;

the vehicle seat being swivelable between a forward facing and a rearward facing orientation relative to the vehicle;

said bottom portion including a swivel adjustment assembly and said base including a plurality of retaining indents for engaging said swivel adjustment assembly whereby said bottom portion is prevented from rotating relative to said base;

a biasing assembly positioned in said interior space of said bottom portion, said biasing assembly being for biasing said swivel arm downwardly into engagement with a selectable one of said retaining indents;

said biasing assembly including a generally S-shaped retention bracket coupled to an interior wall of said bottom portion, said biasing assembly including a biasing member retention plate coupled to an upper surface of said adjustment arm, said biasing member retention plate being aligned with a biasing member retention portion of said retention bracket; and a biasing member being positioned between said biasing member retention plate and said biasing member retention portion of said retention bracket.

9. The vehicle seat assembly of claim 8, further comprising:

said base having a generally cylindrical hole and a threaded connection member extending upwardly in said hole;

said bottom portion having a generally cylindrical connecting portion positionable in said cylindrical hole of said base, said connection portion being coupled to said connection member of said base such that said vehicle seat is rotatable around said connection member of said base.

10. The vehicle seat assembly of claim 8, further comprising:

said base having an annular bottom groove on an upper surface of said base;

said bottom portion having an annular upper groove on a lower surface of said bottom portion, said upper groove being alignable with said lower groove when said bottom portion is engaged to said base; and a plurality of bearings being positioned between said lower groove and said upper groove for facilitating rotation of said bottom portion relative to said base.

11. The vehicle seat assembly of claim 8, further comprising:

said swivel adjustment assembly having an adjustment arm having a proximal end pivotally coupled to said bottom portion, said adjustment arm being positioned substantially within an interior space of said bottom portion, said adjustment arm further having an extension portion depending downwardly from a medial portion of said adjustment arm through an aperture in a bottom of said bottom portion, said adjustment arm having a retaining portion depending downwardly from said extension portion, said retaining portion being insertable into said retaining indents for preventing rotation of said bottom portion relative to said base.

12. The vehicle seat assembly of claim 8, further comprising:

a distal end of said swivel arm protruding outwardly from a side of said bottom portion such that said distal end is adapted for manipulation by a user to disengage said adjustment arm from said retaining indent for permitting rotation of said bottom portion relative to said base.

13. The vehicle seat assembly of claim 8, further comprising:

said plurality of retaining indents comprising a pair of diametrically opposed retaining indents positioned such that said vehicle seat is positioned in a forward facing orientation when said swivel adjustment assembly is engaged to a first one of said pair of retaining indents; and wherein said vehicle seat is positioned in a rearward facing orientation when said swivel adjustment assembly is engaged to a second one of said pair of retaining indents.

14. The vehicle seat assembly of claim 8, further comprising:

said back support portion of said vehicle seat being pivotally coupled to said bottom portion such that said back support portion is selectively positionable substantially coplanar with respect to said bottom portion; and said back support portion further being selectively positionable to fold over said bottom portion of said bottom portion.

15. A vehicle seat assembly for a front passenger area of a vehicle, the vehicle seat assembly comprising:

a vehicle seat having a back support portion and a bottom portion;

a base coupled to the bottom portion, the base being adapted for coupling the seat to a vehicle;

the vehicle seat being rotatable between a forward facing and a rearward facing orientation relative to the vehicle;

said base having a generally cylindrical hole and a threaded connection member extending upwardly in said hole;

said bottom portion having a generally cylindrical connecting portion positionable in said cylindrical hole of said base, said connection portion being coupled to said connection member of said base such that said vehicle seat is rotatable around said connection member of said base;

said base having an annular bottom groove on an upper surface of said base;

said bottom portion having an annular upper groove on a lower surface of said bottom portion, said upper groove being alignable with said lower groove when said bottom portion is engaged to said base;

a plurality of bearings being positioned between said lower groove and said upper groove for facilitating rotation of said bottom portion relative to said base;

said bottom portion including a swivel adjustment assembly and said base including a plurality of retaining indents for engaging said swivel adjustment assembly whereby said bottom portion is prevented from rotating relative to said base;

said swivel adjustment assembly having an adjustment arm having a proximal end pivotally coupled to said bottom portion, said adjustment arm being positioned substantially within an interior space of said bottom portion, said adjustment arm further having an extension portion depending downwardly from a medial portion of said adjustment arm through an aperture in a bottom of said bottom portion, said adjustment arm having a retaining portion depending downwardly from said extension portion, said retaining portion being insertable into said retaining indents for preventing rotation of said bottom portion relative to said base;

a biasing assembly positioned in said interior space of said bottom portion, said biasing assembly being for biasing said swivel arm downwardly into engagement with a selectable one of said retaining indents;

a distal end of said swivel arm protruding outwardly from a side of said bottom portion such that said distal end is adapted for manipulation by a user to disengage said adjustment arm from said retaining indent for permitting rotation of said bottom portion relative to said base;

said biasing assembly including a generally S-shaped retention bracket coupled to an interior wall of said bottom portion, said biasing assembly including a biasing member retention plate coupled to an upper surface of said adjustment arm, said biasing member retention plate being aligned with a biasing member retention portion of said retention bracket;

a biasing member being positioned between said biasing member retention plate and said biasing member retention portion of said retention bracket;

said plurality of retaining indents comprising a pair of diametrically opposed retaining indents positioned such that said vehicle seat is positioned in a forward facing orientation when said swivel adjustment assembly is engaged to a first one of said pair of retaining indents;

wherein said vehicle seat is positioned in a rearward facing orientation when said swivel adjustment assembly is engaged to a second one of said pair of retaining indents;

said back support portion of said vehicle seat being pivotally coupled to said bottom portion such that said back support portion is selectively positionable substantially coplanar with respect to said bottom portion;

said back support portion further being selectively positionable to fold over said bottom portion of said bottom portion; and wherein said back support portion is adapted for being positioned in spaced relationship to an air bag of the vehicle for preventing injury to an infant positioned in said vehicle seat while said vehicle seat is positioned in said rearward facing orientation.

* * * * *